US 9,403,475 B2

(12) United States Patent
Cheng

(10) Patent No.: US 9,403,475 B2
(45) Date of Patent: Aug. 2, 2016

(54) REAR-VIEW MIRROR WITH AUXILIARY LIGHTING FOR REVERSE AND OPEN DOOR ALERT LIGHTING

(71) Applicant: Lung-Pin Cheng, Tainan (TW)

(72) Inventor: Lung-Pin Cheng, Tainan (TW)

( * ) Notice: Subject to any disclaimer, the term of this patent is extended or adjusted under 35 U.S.C. 154(b) by 150 days.

(21) Appl. No.: 14/120,952

(22) Filed: Jul. 15, 2014

(65) Prior Publication Data

US 2016/0016507 A1   Jan. 21, 2016

(51) Int. Cl.
*B60Q 1/26* (2006.01)
*B60Q 1/22* (2006.01)
*B60Q 1/50* (2006.01)

(52) U.S. Cl.
CPC ............... *B60Q 1/2665* (2013.01); *B60Q 1/22* (2013.01); *B60Q 1/50* (2013.01)

(58) Field of Classification Search
CPC ........ B60R 1/1207; B60Q 3/023; B60Q 1/22; B60Q 1/2665
USPC .......................................................... 362/494
See application file for complete search history.

(56) References Cited

U.S. PATENT DOCUMENTS

| 5,871,275 | A | * | 2/1999 | O'Farrell | B60Q 1/22 362/144 |
| 8,568,005 | B2 | * | 10/2013 | Rodriguez Barros | B60Q 1/2665 362/494 |
| 2009/0115631 | A1 | * | 5/2009 | Foote | B60Q 1/2665 340/901 |
| 2011/0001428 | A1 | * | 1/2011 | Rodriguez Barros | B60Q 1/2665 315/77 |
| 2014/0218212 | A1 | * | 8/2014 | Nykerk | B60Q 1/0023 340/901 |

\* cited by examiner

Primary Examiner — Karabi Guharay

(57) ABSTRACT

The invention provides a type of rear-view mirror with auxiliary lighting for reverse and open door alert lighting. The invention consists of an illuminator installed at the bottom of a rear-view mirror, with the illuminator supplied with a power supply unit, two power circuits, a control unit, and a light-emitting element. One of the power circuits is linked to the sensor in the reverse gear while the other power circuit is linked to the sensor in the door handle. Therefore, the invention will provide a better light source for drivers trying to back up their cars during nighttime as well as a wide range light source when doors open to alert upcoming traffic so as to prevent collision by upcoming motorcyclists or bicyclists.

3 Claims, 4 Drawing Sheets

REAR-VIEW MIRROR WITH AUXILIARY LIGHTING FOR REVERSE AND OPEN DOOR ALERT LIGHTING

BACKGROUND OF THE INVENTION

1. Field of the Invention

This invention relates to a rear-view mirror with auxiliary lighting for reverse and open door alert lighting. The concept is installing an illuminator, which is connected to sensors in the reverse gear and door handles, at the bottom of the rear-view mirror. The auxiliary lighting will not only provide a better light source for when cars are in reverse gear but also flash when doors are opened to provide a wide range alert for drivers of cars coming from behind.

2. Description of the Prior Art

The invention is based on the current practice that individuals themselves control the timing of exiting the cars and are likely to not be attentive to the road condition behind them when they are impatient, distracted, or flurried, while drivers of upcoming cars or pedestrians do not know someone is opening the car door to exit ahead of them and thus collide into the open car door. Some drivers may flash their driving lights to alert upcoming cars. However, the alert is still not conspicuous and thus is not very effective. Meanwhile, when cars are backing up during nighttime, low visibility often lead to damage to the cars from scratching or colliding into some objects.

SUMMARY OF THE INVENTION

The primary purpose of this invention is to provide a type of rear-view mirrors that have auxiliary lighting for reverse and open door alert lighting. The invention provides illumination of both sides and rear of the vehicle when the vehicle is in reverse gear and when doors are opened, the flashing light alerts drivers of upcoming vehicles to enhance safety and field of view.

The main characteristics of the invention is an illuminator installed on the rear-view mirror, which illuminator is linked to the reverse gear sensor and the open door sensor in the door handle, the illuminator is equipped with a power supply unit, two power circuits, a control unit and a light-emitting element. The power circuits link the sensor in the reverse gear and the open door sensor in the door handle. In this manner, the light-emitting element is triggered when the vehicle is in reverse gear or the doors are opened to emit a light source of a wider range.

BRIEF DESCRIPTION OF DRAWINGS

This invention is better understood by referring to the accompanying drawings, wherein.

DETAILED DESCRIPTION OF THE PREFERRED EMBODIMENT

Figure 1:
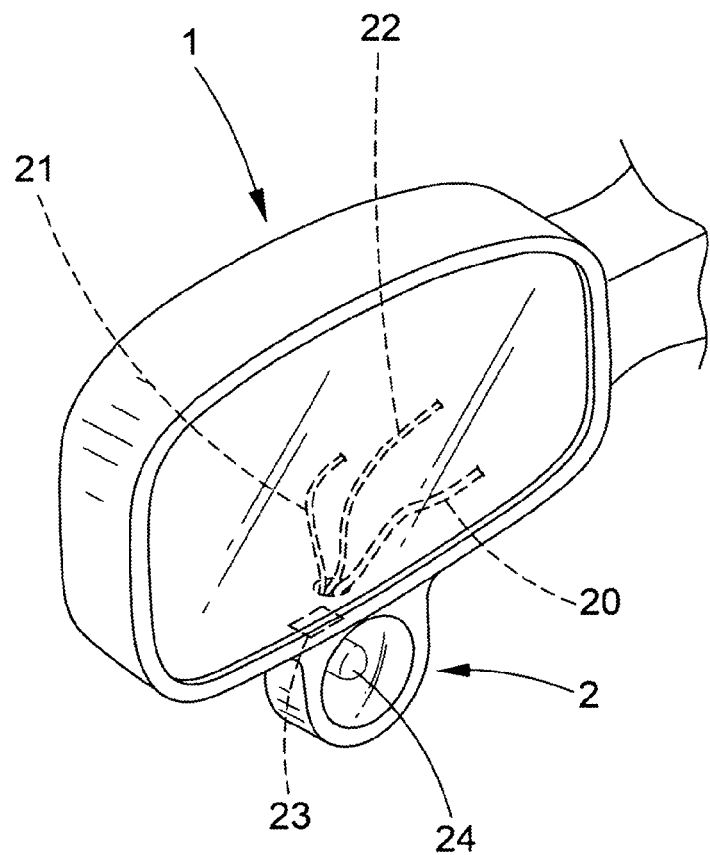
FIG. 1 is a presentation view of the rear-view mirror with auxiliary lighting for reverse and open door alert lighting in the present invention.
Figure 2:
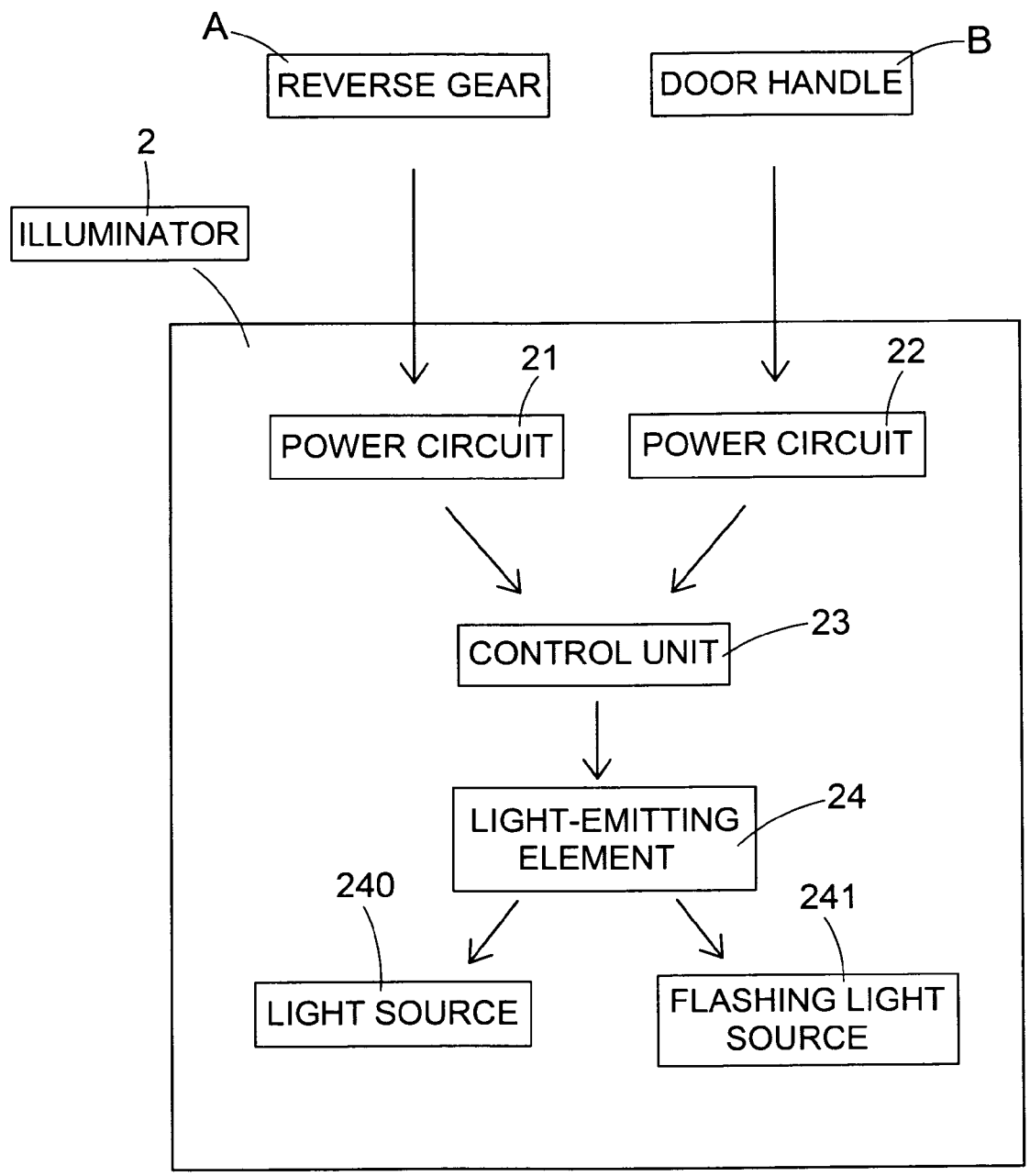
FIG. 2 is a block diagram of the rear-view mirror with auxiliary lighting for reverse and open door alert lighting in the present invention.
Figure 3:
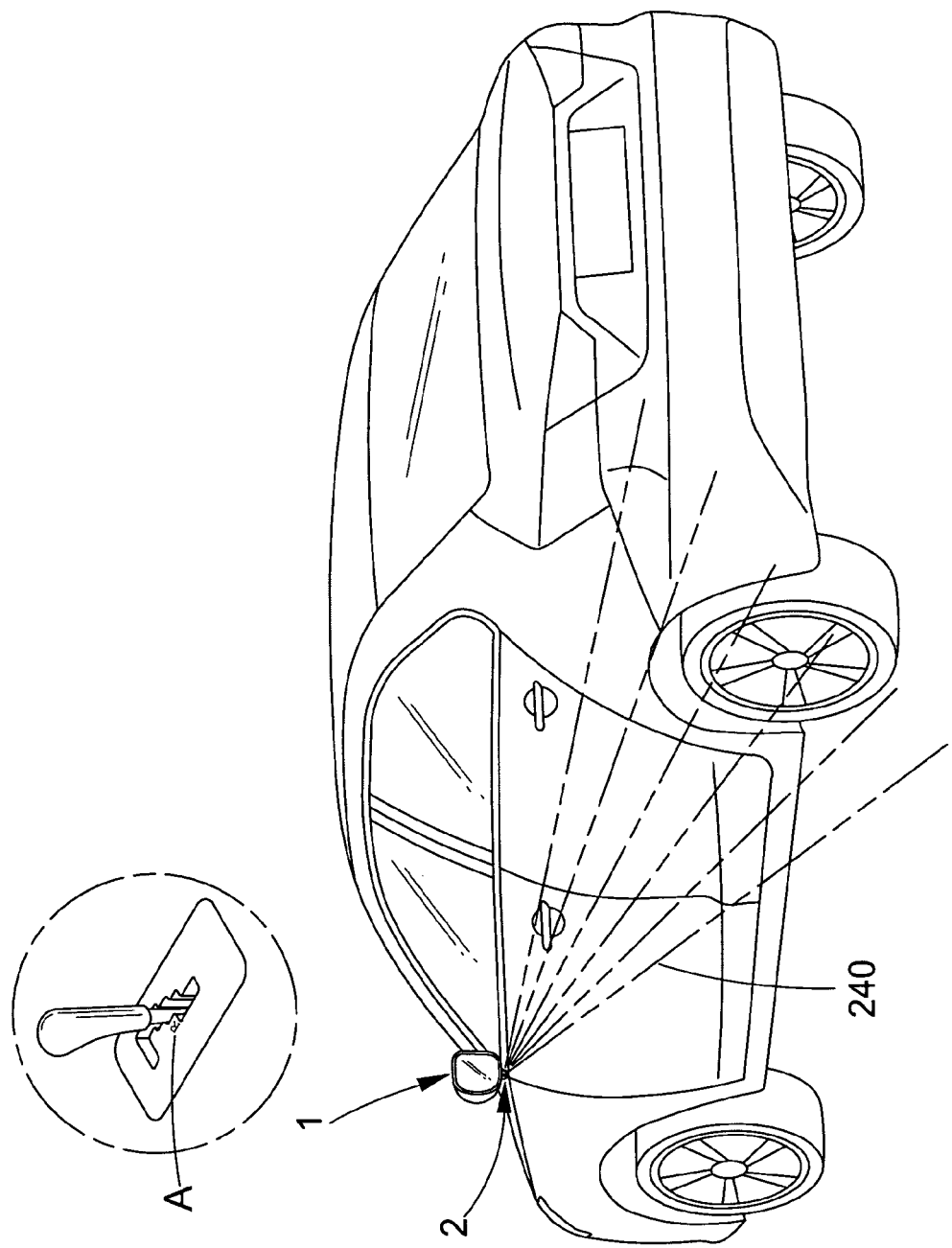
FIG. 3 is a schematic view illustrating an illuminator shining towards the rear of vehicle when vehicle is in reverse gear in the present invention.
Figure 4:
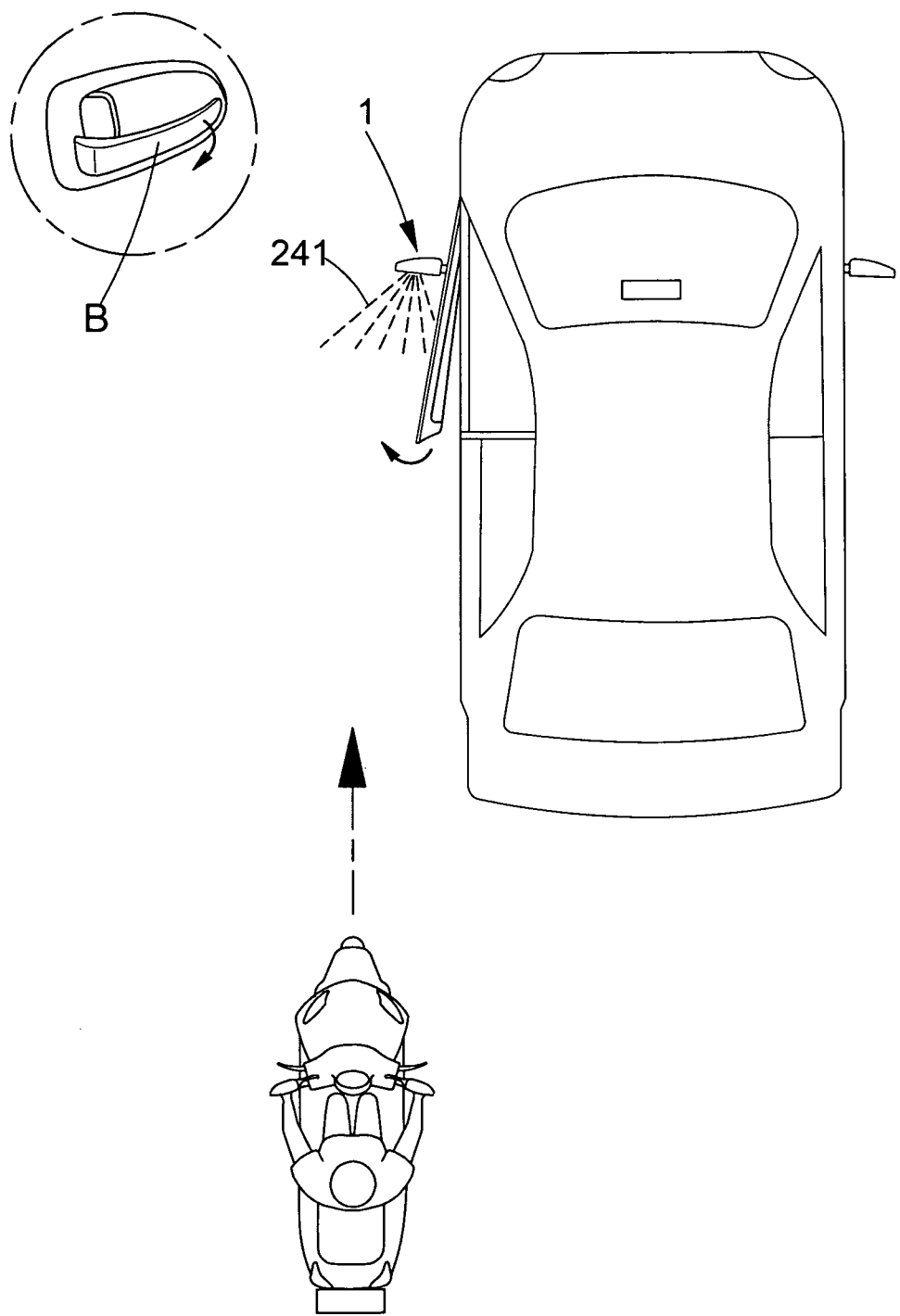
FIG. 4 is a schematic view illustrating an illuminator flashing when door handle is pulled in the present invention.

As shown in FIGS. 1~4, a preferred embodiment consists mainly of a rear-view mirror 1, an illuminator 2 installed in a rear-view mirror 1.

The illuminator 2 is equipped with a power supply unit 20, power circuit 21, power circuit 22, control unit 23, and light-emitting element 24. The power supply unit 20 is linked to the power supply of the vehicle to provide electricity for the illuminator 2, the power circuit 21 is linked to a sensor in the reverse gear (A) of the vehicle, and power circuit 22 is linked to a sensor in the door handle (B) of the vehicle. The control unit 23 is linked to the power circuits 21 and 22 and receives and determines the source of signal and controls the light-emitting element 24 to emit the required kind of light. The light-emitting element 24 may be set as a light source 240 or a flashing light source 241.

To use, when going in reverse at night, the driver puts the vehicle in reverse gear (A), power circuit 21 forms an energized current path linking the control unit 23 within the illuminator 2 in the bottom of the rear-view mirror 1 on either side. The control unit 23 in term activates the light source 240 of the light-emitting element 24, which light source 240 shines a light of an appropriate range towards the wheels and the rear of the vehicle, allowing the driver to see clearly the actual condition of the rear of the vehicle and the ground on either side through the rear-view mirror 1 and making parking at night safer and easier. After the driver has parked the vehicle and shifts the handle out of the reverse gear (A), the power circuit 21 and the control unit 23 form a short circuit and the light-emitting element 24 stops illuminating instantly. When the vehicle is in park gear and the driver or passenger wants to open the door, pulling the door handle (B) will trigger the sensor in the door handle (B), and the power circuit 22 will form an energized current path linking the control unit 23 within the illuminator 2 on the rear-view mirror 1, which in term makes the light-emitting element 24 to emit a wide-range flashing light source 241 alert to notify the upcoming motorcyclists, car drivers or pedestrians of an opening car door ahead of them. When the doors are closed, the power circuit 22 and the control unit 23 form a short circuit and the light-emitting element 24 instantly stops flashing. This will help achieve the purpose of preventing collision into the car door.

The invention has the following advantages as can be seen from the foresaid description.

1. The light-emitting element 24 of this invention can provide a wide-range light source 240.

2. The light-emitting element 24 for the open door sensor can provide a wide-range flashing light source 241, which is more noticeable for upcoming traffic and thus better achieves the purpose of collision prevention.

While the preferred embodiment of the invention has been described above, it will be recognized and understood that various modifications may be made therein and the appended claims are intended to cover all such modifications that may fall within the spirit and scope of the invention.

What is claimed is:

1. A rear-view mirrors that have auxiliary lighting for reverse and open door alert lighting, primarily comprising an illuminator installed on the rear-view mirror, said illuminator is linked to a reverse gear sensor and an open door sensor in a door handle, said illuminator is equipped with a power supply unit, two power circuits, a control unit and a light-emitting element, one of said two power circuits links the reverse gear sensor and other of said two power circuits links the open door sensor in the door handle; in this manner, said light-emitting element is triggered when the vehicle is in reverse gear or the doors are opened to emit an illumination source of a wider range.

2. The rear-view mirrors with auxiliary lighting for reverse and open door alert lighting as claimed in claim 1, wherein said light-emitting element is capable of providing a wide-range illumination.

3. The rear-view mirrors with auxiliary lighting for reverse and open door alert lighting as claimed in claim 1, wherein said light-emitting element has the functions of a steady light source and a flashing light source.

\* \* \* \* \*